UNITED STATES PATENT OFFICE.

MARTIN L. GRIFFIN, OF HOLYOKE, AND EDWARD S. THAYER AND EDGAR S. BUFFUM, OF SALEM, MASSACHUSETTS.

RECOVERING FATTY PRODUCTS.

SPECIFICATION forming part of Letters Patent No. 443,940, dated December 30, 1890.

Application filed June 18, 1889. Serial No. 314,768. (No specimens.)

*To all whom it may concern:*

Be it known that we, MARTIN L. GRIFFIN, of Holyoke, Hampden county, and EDWARD S. THAYER and EDGAR S. BUFFUM, of Salem, in the county of Essex and State of Massachusetts, have invented certain new and useful improvements in the manufacture, recovery, and purification of wool grease and oils from the scouring-suds of woolen industry, &c., of which the following is a full, clear, and exact description.

This invention relates to the obtaining of fatty products or the recovery and purification of wool grease and oils from the scouring-suds of woolen industry, and is also applicable to the recovery and purification of other waste and unrecovered greases and oils from sewage residuum, from tankage and glue waters, from slaughter and packing houses, fertilizer and soap works, &c.; and the invention consists of a novel process of treating the scouring-suds of wool or other waste or residuum, (which is scouring-suds of wool or other waste with the bulk of the water removed,) or like material for the production of grease and oils for various purposes, all substantially as hereinafter fully described.

In carrying out this invention the residuum of the scouring-suds of wool or other matter to be operated upon, which is obtained by removing the water therefrom by pressure, evaporation, centrifugal force, or by any well-known method, is treated to a diluted solution of sulphuric acid in any suitable vessel, the acid solution being composed of about one (1) part of the acid to seven (7) parts of water, and when thoroughly saturated the whole is mixed with a suitable porous and granular medium, such as charcoal or sawdust, in about the proportion of ten (10) parts of the residuum of the scouring-suds, &c., to about thirty (30) parts of the charcoal or sawdust, which are thoroughly mixed together. To the mixture is then added a sufficient quantity of naphtha or bisulphide of carbon, ether, &c., and the oils and fats extracted therefrom in any of the usual and well-known ways of extraction of oils and fats by naphtha, &c., when the material is ready for use for various purposes, such as stuffing for leather, &c.

In lieu of treating residuum of scouring-suds of wool, the residuum of any waste and unrecovered greases and oils from sewage, from tankage and glue waters, from slaughter and packing houses, fertilizer and soap works, &c., can be treated by this process.

It is essential that the absorbing substance used should be light and one that is of less specific gravity than water, and although charcoal or sawdust are preferable to use, in lieu of these others can be used, such as shavings, dry animal-manure, peat, cotton-seed hulls, spent brewers' grains, bran, chaff, fish scrap, or any animal or vegetable substance or material, which would present a large area of surface and bulk, also having large interstitial capacity for the absorption of moisture and the subsequent treatment with the solvent; also, in lieu of using sulphuric acid any suitable acid can be used. The object and effect of this mixing with the absorbing material, as above described, are to absorb into the convenient medium the moisture and grease, whereby the impurities adhere to the porous substance and the solvent can readily and thoroughly penetrate every particle of the mass.

The proportions of the materials used can be varied more or less, as desired; but the proportions as herein stated produce satisfactory and practical results.

Having thus described our invention, what we claim is—

The method of obtaining fatty products by treating the residuum of scouring-suds or like material, which consists in adding acid, mixing therewith a porous and granular substance in sufficient excess to retain its granular shape, and finally treating it with a suitable solvent, such as naphtha or bisulphide of carbon, substantially as set forth.

In testimony whereof we have hereunto set our hands in the presence of subscribing witnesses.

MARTIN L. GRIFFIN.
    EDWARD S. THAYER.
    EDGAR S. BUFFUM.

Witnesses to Martin L. Griffin:
 A. F. HITCHCOCK,
 EDGAR S. BUFFUM.

Witnesses to Edward S. Thayer and Edgar S. Buffum:
 E. O. HOWARD,
 F. W. HERRICK.